United States Patent [19]

Kumamoto

[11] Patent Number: 5,253,332
[45] Date of Patent: Oct. 12, 1993

[54] APPROXIMATE REASONING APPARATUS WITH KNOWLEDGE SYNTHESIZING/REVISING AND CLARITY COMPUTING

[75] Inventor: Hiroshi Kumamoto, Kyoto, Japan
[73] Assignee: Omron Corporation, Kyoto, Japan
[21] Appl. No.: 719,995
[22] Filed: Jun. 24, 1991

[30] Foreign Application Priority Data

Jul. 27, 1990 [JP] Japan .................. 2-197763

[51] Int. Cl.$^5$ ............................................. G06F 15/18
[52] U.S. Cl. .................................... 395/51; 395/61; 395/900
[58] Field of Search ............... 395/3, 900, 61, 51

[56] References Cited

U.S. PATENT DOCUMENTS 4,860,214 8/1989 Matsuda et al. ................ 395/61

FOREIGN PATENT DOCUMENTS 334,113 9/1989 European Pat. Off. .
355,716 2/1990 European Pat. Off. .

OTHER PUBLICATIONS

Lee, "Fuzzy Logic in Control Systems: Fuzzy Logic Controller, Part II," Transactions on Systems, Man, and Cybernetics, vol. 20, No. 2 Mar./Apr. 1990, pp. 419-435.

Giles, "The Concept of Grade of Membership," Fuzzy Sets and Systems 25 (1988) 297-323.

Chiu et al, "A Fuzzy Logic Programming Environment for Real Time Control," International Journal of Approximate Reasoning, 1988, 2:163-175.

Lee, "Fuzzy Logic In Control Systems: Fuzzy Logic Controller;" Part 1, IEEE Transactions on Systems, Man and Cybernetics, vol. 20, No. 2, Mar./Apr. 1990; pp. 404-418.

Fuzzy Sets and Systems, Vol. 23, No. 1, 1987, pages 73-87; Norris, et al.

Computational Intelligence, Vol. 4, No. 3, 1988, pages 244-264, Dubois, Prade

Primary Examiner—Allen R. Macdonald
Attorney, Agent, or Firm—Dickstein, Shapiro & Morin

[57] ABSTRACT

When a relationship between a factor and a conclusion has occurred, data indicative of this relationship is stored in a case-history file. For example, in an apparatus which uses approximate reasoning to perform fault diagnosis, the type of a fault and its symptoms are recorded (in a repair report, maintenance report or the like) when the fault occurs. A knowledge base is revised or created by such case-history file data. The possibility of a conclusion, static information quantities, clarity of a conclusion, etc., are computed based upon such a knowledge base.

11 Claims, 8 Drawing Sheets

Fig.6

| NUMBER OF OCCURRENCES | 1 | 2 | 3 | 4 | 5 |
|---|---|---|---|---|---|
| CONCLUSION / FACTOR | c1 | c2 | c1 | c1 | c1 |
| f1 | 30 | - | 60 | 20 | 50 |
| f2 | 60 | 10 | 50 | - | 60 |
| f3 | - | 30 | - | - | - |

APPROXIMATE REASONING APPARATUS WITH KNOWLEDGE SYNTHESIZING/REVISING AND CLARITY COMPUTING

BACKGROUND OF THE INVENTION

1. Field of the Invention

This invention relates to an approximate reasoning apparatus.

2. Description of the Related Art

Approximate reasoning in a method of revising or altering the results of reasoning depending upon information quantities of factors used in order to derive the results of reasoning is known. (For example, see "AN EXPERT SYSTEM WITH THINKING IN IMAGES", by Zhang Hongmin, Preprints of Second IFSA Congress, Tokyo, Jul. 20–25, 1987, p. 765.)

This approximate reasoning method involves using a membership function given for every conclusion relative to a factor to calculate the information quantity of every factor (i.e., the information identifying capability of a factor), and revising or altering the results of reasoning (namely the possibility that a conclusion will hold) depending upon information quantities of factors used in order to derive the conclusion (wherein the revision or alteration involves taking the product of possibility and information quantity), thereby improving the capability to identify the results of reasoning.

With this conventional method of approximate reasoning, however, experts are required when constructing or revising the knowledge base, and this is very troublesome. In addition, performing maintenance on the knowledge base is difficult.

SUMMARY OF THE INVENTION

Accordingly, an object of the present invention is to make it possible to improve and newly construct a knowledge base using case-history data.

According to the present invention, the foregoing objects are attained by providing an approximate reasoning apparatus comprising knowledge memory means for storing knowledge which represents relationships between factors and conclusions already established, synthesized knowledge memory means for storing knowledge synthesized with regard to the same factors and conclusions, case-history data memory means for storing data representing relationships between factors and conclusions which actually have occurred, and knowledge synthesizing/revising means which synthesizes knowledge that concerns the same factors and conclusions stored in the knowledge memory means, and which, by using the data stored in the case-history data memory means, re-synthesizes the synthesized knowledge that concerns this data and the same factors and conclusions, wherein the the knowledge re-synthesized by the knowledge synthesizing/revising means is used to update the synthesized knowledge in the synthesized knowledge memory means that concerns this knowledge and the same factors and conclusions.

In accordance with the present invention, data representing the relationships between factors and conclusions which have occurred is accumulated in memory, thereby making it possible to revise a knowledge base, which has already been established (e.g., at the design stage), using the accumulated data. Since the knowledge base is revised using data representing the relationships between factors and conclusions which actually have occurred, more accurate approximate reasoning becomes possible. In addition, since revision of the knowledge base is performed automatically, maintenance of the knowledge base is possible without the aid of experts.

In a case where the approximate reasoning apparatus of the present invention is used in fault diagnosis, the data representing the relationships between the factors and conclusions which have occurred is data representing the relationships between the types of faults and the mechanical symptoms (symptoms that can be perceived by the five senses, measured values sensed by a sensor, etc.) prevailing at the time of the fault, and this data is recorded in a fault report, maintenance report or the like. Alternatively, the data can be collected automatically and stored in a memory.

The approximate reasoning apparatus described above further comprises approximate reasoning means for computing the possibility of a conclusion by applying factor-input data to the knowledge stored in the synthesized knowledge memory means.

The approximate reasoning means includes degree-of-membership computing means for converting inputted data into degree of membership using a membership function represented by the above-mentioned knowledge, dynamic information quantity computing means for obtaining a dynamic information quantity for every factor using this degree of membership, and possibility computing means for obtaining the possibility of a conclusion using the degree of membership and the dynamic information quantity.

When the knowledge stored in the synthesized knowledge memory means is updated, the approximate reasoning means performs re-calculation based upon the knowledge after updating. This makes possible more correct reasoning.

The approximate reasoning apparatus further includes static information quantity computing means for computing a static information quantity of each factor based upon the synthesized knowledge. The static information quantity of a factor indicates the capability of a membership function of a factor to identify a conclusion.

The static information quantity computing means re-computes the static information quantity of each factor in relation to the re-synthesized knowledge when the synthesized knowledge is re-synthesized.

The approximate reasoning apparatus further includes clarity computing means for computing the clarity of each factor for every conclusion using the static information quantities computed by the static information quantity computing means.

The clarity computing means re-computes clarity using the static information quantities obtained by re-computation when the synthesized knowledge is re-synthesized.

The approximate reasoning apparatus further comprises adding means for computing the clarity of every conclusion by adding the clarity of factors, for which data has actually been inputted, using the clarity obtained from the clarity computing means.

The reliability of a conclusion can be determined from the added clarities.

According to another aspect of the invention, the approximate reasoning apparatus comprises case-history data memory means for storing the relationship between factors and conclusions which have occurred, data synthesizing means for synthesizing, as one item of data, a plurality of items of data regarding the same factors and conclusions stored in the case-history data memory means, synthesized data memory means for storing data synthesized by the data synthesizing means, and approximate reasoning means for computing the possibility of a conclusion by applying factor-input data to the synthesized data stored in the synthesized data memory means.

In accordance with the present invention, data representing the relationship between factors and conclusions which have occurred in the past is accumulated in memory, and a knowledge base is created based upon the accumulated data. This makes possible the construction of a knowledge base automatically without the aid of experts.

The approximate reasoning means includes degree-of-membership computing means for converting inputted data into degree of membership using a membership function represented by the above-mentioned synthesized data, dynamic information quantity computing means for obtaining a dynamic information quantity for every factor using this degree of membership, and possibility computing means for obtaining the possibility of a conclusion using the degree of membership and the dynamic information quantity.

The approximate reasoning apparatus further includes static information quantity computing means for computing a static information quantity of each factor based upon the synthesized data, clarity computing means for computing the clarity of each factor for every conclusion using the static information quantities computed by the static information quantity computing means, and adding means for computing the clarity of every conclusion by adding the clarity of factors, for which data has actually been inputted, using the clarity obtained from the clarity computing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram showing the contents of a memory unit storing case-history data;

DESCRIPTION OF THE PREFERRED EMBODIMENTS

(1) Overall construction of the approximate reasoning apparatus

Figure 1:
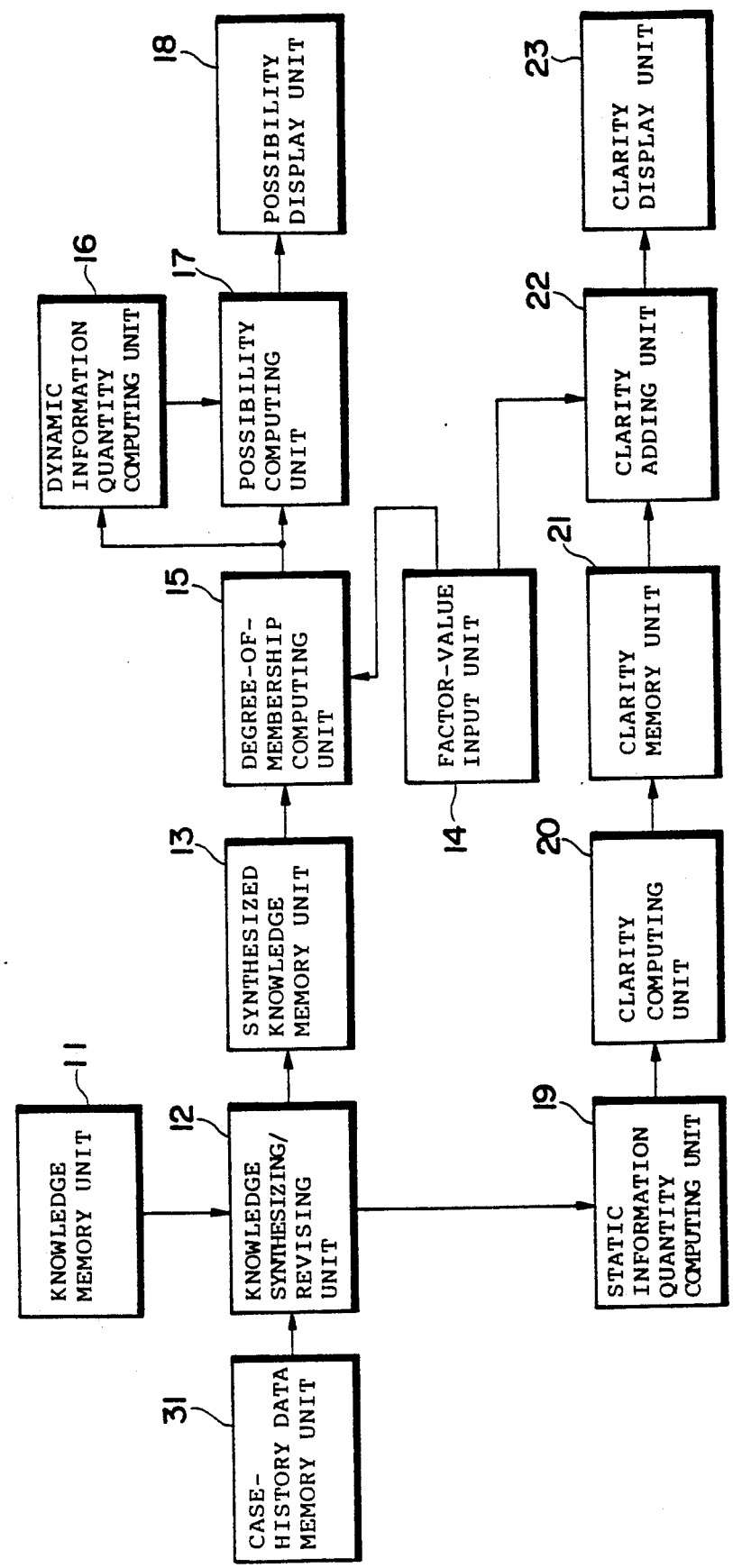
FIG. 1 is a block diagram illustrating an example of the overall construction of an approximate reasoning apparatus according to a first embodiment of the present invention.
Figure 7:
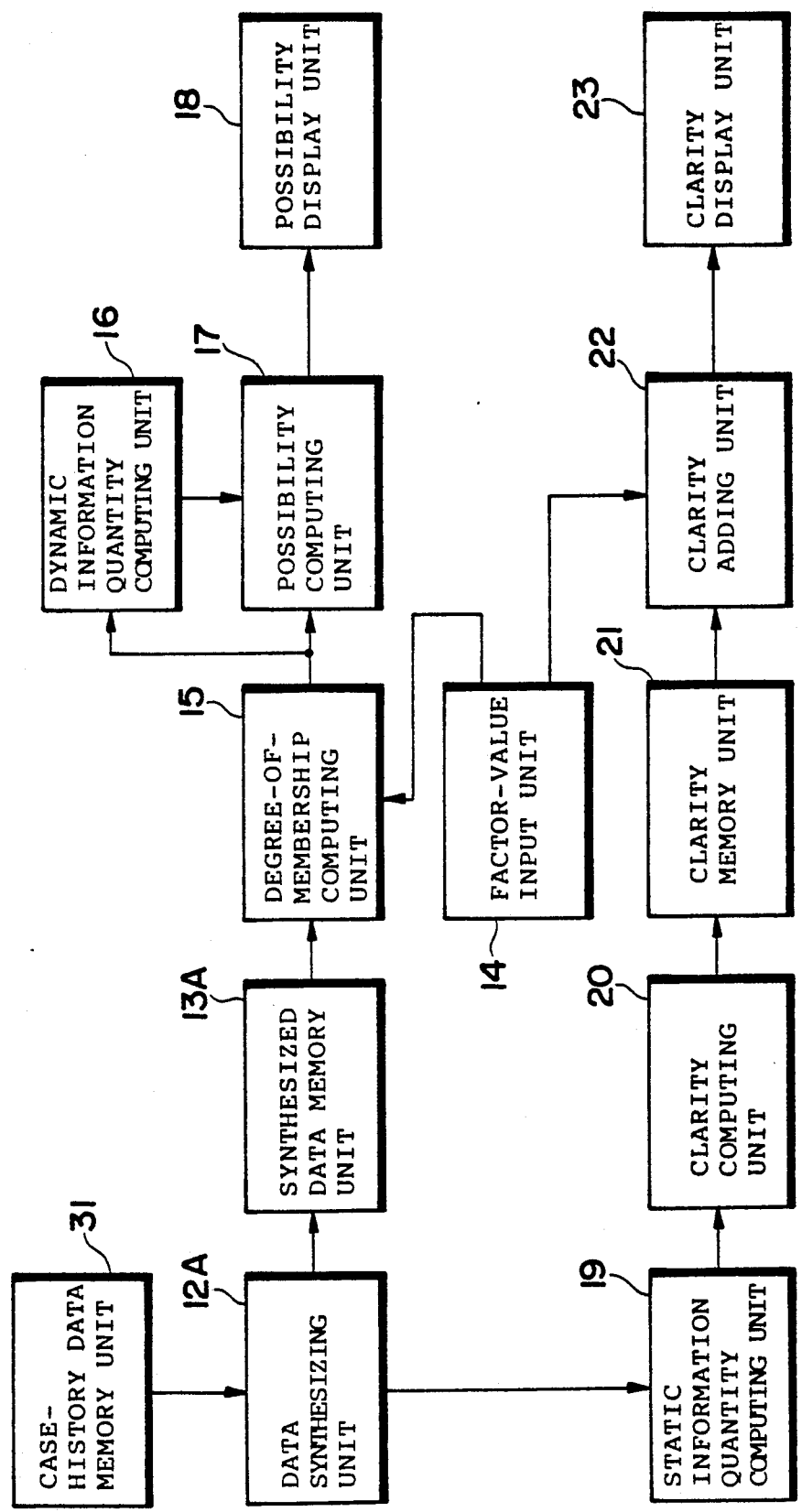
FIG. 7 is a block diagram illustrating an example of the overall construction of an approximate reasoning apparatus according to a second embodiment of the present invention and FIGS. 8a through 8d are graphs showing distributions of case-history data.

FIGS. 1 and 7 illustrate examples of the overall construction of an approximate reasoning apparatus. FIG. 1 illustrates an approximate reasoning apparatus according to a first embodiment, and FIG. 7 illustrates an approximate reasoning apparatus according to a second embodiment.

In FIG. 1, the approximate reasoning apparatus of the first embodiment comprises a knowledge memory unit 11, a knowledge synthesizing/revising unit 12, a synthesized knowledge memory unit 13, a factor-value input unit 14, a degree.of.membership computing unit 15, a dynamic information quantity computing unit 16, a possibility computing unit 17, a possibility display unit 18, a static information quantity computing unit 19, a clarity computing unit 20, a clarity memory unit 21, a clarity adding unit 22, a clarity display unit 23, and a case-history data memory unit 31.

In FIG. 7, the approximate reasoning apparatus of the second embodiment is not provided with the knowledge memory unit 11 shown in FIG. 1. Further, the knowledge synthesizing/revising unit 12 and synthesized knowledge memory unit 13 of FIG. 1 are replaced by data synthesizing unit 12A and a synthesized data memory unit 13A, respectively. Other components in FIG. 7 are the same as shown in FIG. 1.

Thus, the approximate reasoning apparatus of the first and second embodiments possess many common elements, and these common elements constitute the principal portions of the approximate reasoning apparatus. Accordingly, these common elements will be described first with reference to FIG. 1, then the structural components and operations peculiar to the first and second embodiments will be described individually.

(2) Knowledge memory unit

The knowledge memory unit 11 stores knowledge, which has been inputted by an expert or the like (at a design stage, for example), in a form which indicates the relationships between factors and conclusions. This unit is capable of storing the knowledge of a plurality of experts.

Examples of the knowledge of two experts $ex_1$, $ex_2$ stored in the knowledge memory unit 11 are illustrated below in the form of rules.

Expert $ex_1$:

$$If\ 20 \leq f_1 \leq 60,\ 0\ f_2 \leq 40,\ then\ c_1 \qquad (1)$$

$$If\ 40 \leq f_1 \leq 80,\ 60\ f_2 \leq 100,\ then\ c_2 \qquad (2)$$

Expert $ex_2$:

$$If\ 30 \leq f_1 \leq 50,\ 10\ f_2 \leq 30,\ then\ c_1 \qquad (3)$$

$$If\ 50 \leq f_1 \leq 70,\ 70\ f_2 \leq 90,\ then\ c_2 \qquad (4)$$

Here $f_1$ and $f_2$ are factors, which shall be referred to as factor 1 and factor 2, respectively, hereinafter. Further $c_1$ and $c_2$ are conclusions, which shall be referred to as conclusion 1 and conclusion 2, respectively.

Further, a, b expressed such that $1 \leq f_1 \leq b$ holds shall be referred to as minimum and maximum values, respectively, hereinafter.

The foregoing rules become as follows for each expert when expressed in the form of a table:

TABLE 1

| | EXPERT $ex_1$ | | | |
|---|---|---|---|---|
| | CONCLUSION | | | |
| | $c_1$ | | $c_2$ | |
| FACTOR | MINIMUM VALUE | MAXIMUM VALUE | MINIMUM VALUE | MAXIMUM VALUE |
| $f_1$ | 20 | 60 | 40 | 80 |
| $f_2$ | 0 | 40 | 60 | 100 |

TABLE 2

| | EXPERT $ex_2$ | | | |
|---|---|---|---|---|
| | CONCLUSION | | | |
| | $c_1$ | | $c_2$ | |
| FACTOR | MINIMUM VALUE | MAXIMUM VALUE | MINIMUM VALUE | MAXIMUM VALUE |
| $f_1$ | 30 | 50 | 50 | 70 |
| $f_2$ | 10 | 30 | 70 | 90 |

(3) Knowledge synthesizing/revising unit

The knowledge synthesizing/revising unit 12 combines the knowledge of the plurality of experts, which has been stored in the knowledge memory unit 11, into a single body of knowledge.

The knowledge synthesizing/revising unit 12 functions also to revise the combined (synthesized) knowledge using case-history data stored in the case-history data memory unit 31. This will be described in detail later in the section dealing with the first embodiment.

Though there are various methods of synthesizing knowledge, here the mean value and standard deviation of a plurality of experts are calculated with regard to the maximum and minimum values of each factor participating in each conclusion.

Knowledge synthesizing processing will now be described taking as an example knowledge which derives the conclusion $c_1$ from the factor $f_1$ of the two experts mentioned above.

When rules for obtaining conclusion 1 ($c_1$) from factor 1 ($c_1$) are extracted from the above-mentioned rules [Eq. (1) and Eq. (3)], they are expressed as follows:

Expert $ex_1$: if $20 \leq f_1 \leq 60$ then $c_1$  (5)

Expert $ex_2$: if $30 \leq f_1 \leq 50$ then $c_1$  (6)

The mean value $m_{min}$ of the minimum values and the mean value $m_{max}$ of the maximum values are calculated.

$$m_{min} = \frac{20 + 30}{2} = 25 \quad (7)$$

$$m_{max} = \frac{60 + 50}{2} = 55 \quad (8)$$

The standard deviation $\sigma_{min}$ of the minimum values and the standard deviation $\sigma_{max}$ of the maximum values are calculated.

$$\sigma_{min} = \left( \frac{20^2 + 30^2}{2} - m_{min}^2 \right)^{\frac{1}{2}} = 5 \quad (9)$$

$$\sigma_{max} = \left( \frac{60^2 + 50^2}{2} - m_{max}^2 \right)^{\frac{1}{2}} = 5 \quad (10)$$

When such processing for combining the knowledge of the experts is carried out for all minimum and maximum values of each factor participating in each conclusion with regard to the above-mentioned rules [Eqs. (1) through (4)], the following table is obtained:

TABLE 3

| | CONCLUSION | | | | | | | |
|---|---|---|---|---|---|---|---|---|
| | $c_1$ | | | | $c_2$ | | | |
| | MINIMUM VALUE | | MAXIMUM VALUE | | MINIMUM VALUE | | MAXIMUM VALUE | |
| FACTOR | AV. VALUE | STAND. DEV. | AV. VALUE | STAND. DEV. | AV. VALUE | STAND. DEV. | AV. VALUE | STAND. DEV. |
| $f_1$ | 25 | 5 | 55 | 5 | 45 | 5 | 75 | 5 |
| $f_2$ | 5 | 5 | 35 | 5 | 65 | 6 | 95 | 5 |

Generally, in approximate reasoning, a membership function is given for a factor. As one example, a method will be described in which a membership function is obtained by a Gaussian distribution using the knowledge of experts combined as set forth above.

A membership function is expressed by the following equation using the mean value $m_{min}$ of minimum values, the mean value $m_{max}$ of maximum values, the standard deviation $\sigma_{min}$ of minimum values and the standard deviation $\sigma_{max}$ of maximum values:

$$\Phi(x) = \text{Gauss}\left( \frac{x - x_{min}}{\sigma_{min}} \right) - \text{Gauss}\left( \frac{x - x_{max}}{\sigma_{max}} \right) \quad (11)$$

where x: value of data inputted $\Phi(x)$: degree to which input data belongs to factor (degree of membership)

Gauss (x): value of Gaussian distribution in input x

Figure 2:
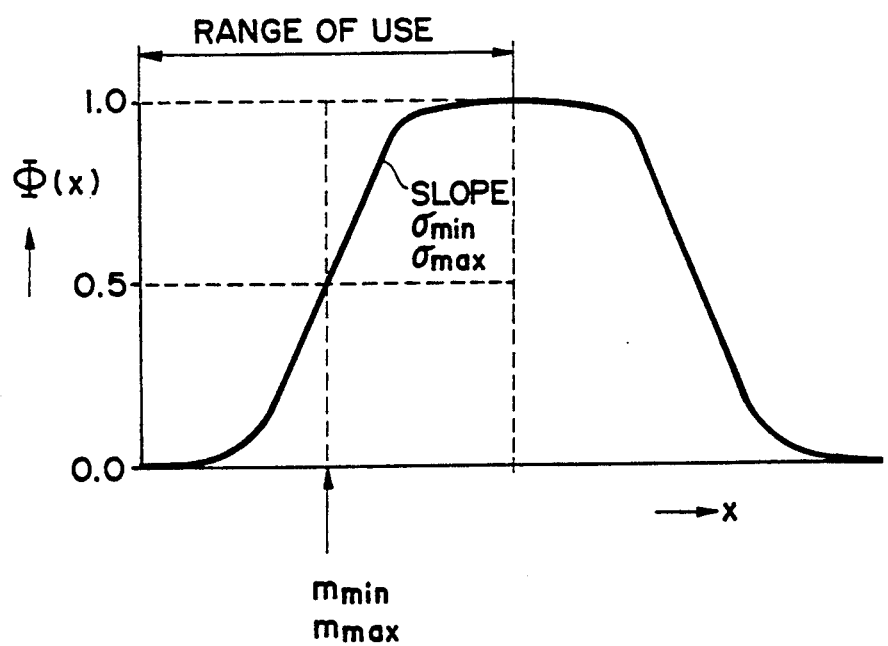
FIG. 2 is a graph depicting a Gaussian distribution.

FIG. 2 illustrates an example of a Gaussian distribution. In this Gaussian distribution, only the left half is used in order to form the membership function. The position of x in $\Phi(x)=0.5$ is decided by $m_{min}$ or $m_{max}$, and the slope is decided by $\sigma_{min}$ or $\sigma_{max}$.

Figure 3A:
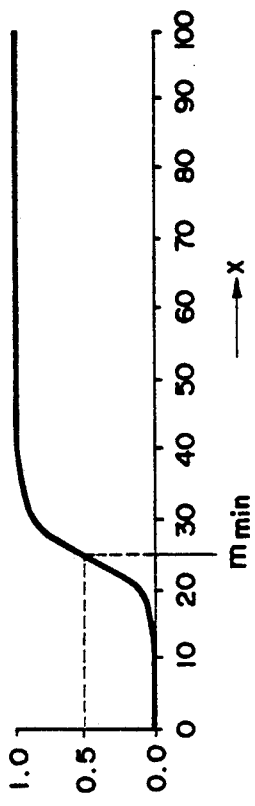
FIGS. 3a through 3c are graphs showing the manner in which a membership function is formed.
Figure 3B:
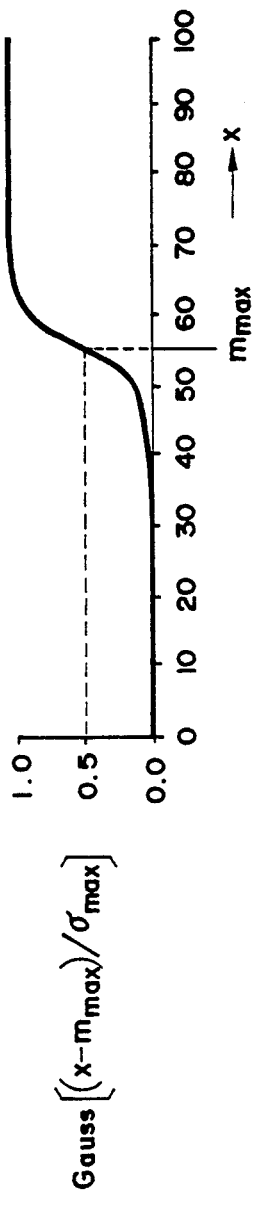
Figure 3C:
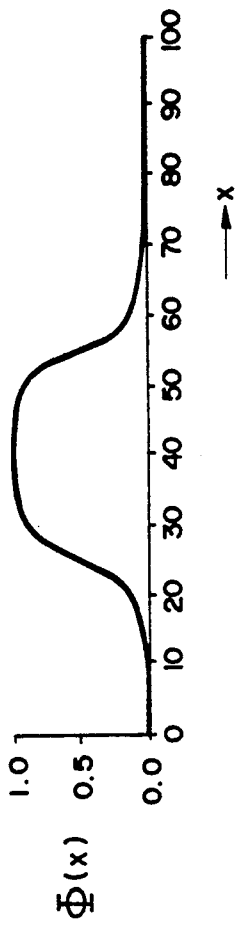

As one example, a membership function for obtaining the conclusion $c_1$ from factor $f_1$ is formed as in the manner of FIG. 3c from FIG. 3a using a value calculated from Eq. (7) through Eq. (10). In this case, Eq. (11) becomes as follows:

$$\Phi(x) = \text{Gauss}\left(\frac{x-25}{5}\right) - \text{Gauss}\left(\frac{x-55}{5}\right) \tag{12}$$

FIG. 3a represents the first term on the right side of Eq. (11) or (12), FIG. 3b represents the second term on the right side of Eq. (11) or (12), and FIG. 3c represents the result of subtracting the second term from the first term, namely a membership function expressed by Eq. (11) or (12).

Figure 4A:
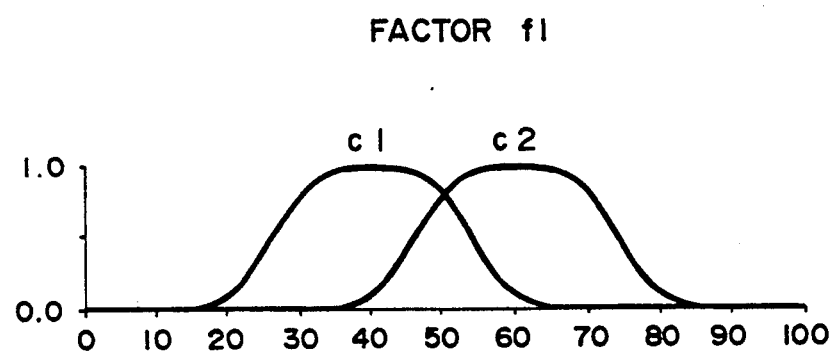
FIGS. 4a and 4b are graphs illustrating membership functions obtained for each factor.
Figure 4B:
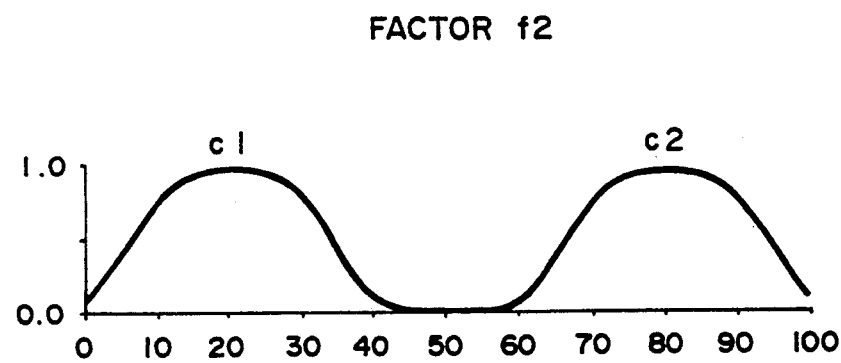

FIGS. 4a and 4b illustrate examples of membership functions for obtaining the conclusions $c_1$, $c_2$ with regard to the factors $f_1$, $f_2$ formed based upon the combined knowledge shown in Table 3.

(4) Synthesized knowledge memory unit

The synthesized knowledge memory unit 13 stores the mean values and standard deviation values, which have been calculated by the knowledge synthesizing/revising unit 12, in the form shown in Table 3. Since the combining of knowledge is not required to be carried out whenever reasoning is performed, the results of calculated are thus stored in advance. Then, by reading out the values from the memory unit 13 and using them whenever reasoning is performed, reasoning processing can be executed at high speed.

(5) Factor-value input unit

The factor-value input unit 14 is for reading in input data, which is entered for every factor, from a keyboard, a communication interface device, a memory, a file, etc. The inputted data is applied to the degree-of-membership computing unit 15. In addition, the factor-value input unit 14 provides the clarity adding unit 22 with information indicating whether data relating to each factor has been entered. The factor data can be given not only as definite values but also as linguistic values or membership functions.

(6) Degree-of-membership computing unit

The degree-of-membership computing unit 15 calculates the degree to which the data inputted from the factor-value input unit 14 belongs to each membership function (or conclusion). More specifically, the degree of membership is obtained as $\Phi(x)$ by substituting the input data as the variable x on the right side of Eq. (11) in a case where the input data is a definite value. Of course, it is not absolutely necessary to use an arithmetic expression of this kind. In a case where the input data is a linguistic value or membership function, the degree of membership would be calculated using a MIN-MAX operation, by way of example.

(7) Dynamic information computing unit and static information computing unit Let $x_1$ represent the factor value (input data) of factor $f_1$, and let $x_2$ represent the factor value of factor $f_2$. These items of data are inputted from the factor-value input unit 14.

Figure 5A:
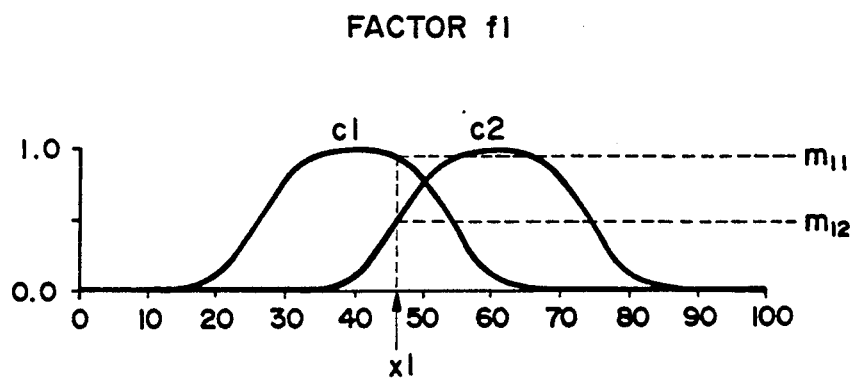
FIGS. 5a and 5b are graphs illustrating the manner in which degree of membership is obtained.
Figure 5B:
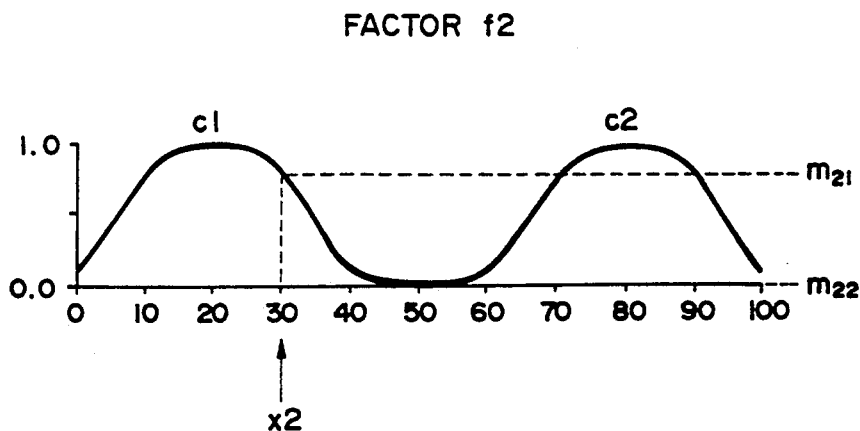

Degrees of membership $m_{11}$, $m_{12}$, $m_{21}$, $m_{22}$ are decided as follows, as shown in FIGS. 5a and 5b:

$m_{11}$: degree of membership of input data $x_1$ in conclusion $c_1$ $m_{12}$: degree of membership of input data $x_1$ in conclusion $c_2$ $m_{21}$: degree of membership of input data $x_2$ in conclusion $c_1$ $m_{22}$: degree of membership of input data $x_2$ in conclusion $c_2$ These degrees of membership are calculated by the degree-of-membership computing unit 15 when the items of input data $x_1$, $x_2$ are applied thereto.

The concept of fuzzy entropy will now be considered.

Fuzzy entropy Ef1 when the input $x_1$ is applied is defined as follows:

$$Ef1 = -\frac{m_{11}}{m_{11}+m_{12}}\log\left(\frac{m_{11}}{m_{11}+m_{12}}\right) \\ -\frac{m_{12}}{m_{11}+m_{12}}\log\left(\frac{m_{12}}{m_{11}+m_{12}}\right) \tag{13}$$

Fuzzy entropy is a type of index of information identification capability. The greater the clarity with which a conclusion can be identified when the input data $x_1$ is applied, the smaller the value of fuzzy entropy. Conversely, the greater the degree of ambiguity involved in identifying a conclusion, the larger the value of fuzzy entropy becomes. In other words, the greater the difference between the degree of membership $m_{11}$ of the input data $x_1$ in the conclusion $c_1$ and the degree of membership $m_{12}$ of the input data $x_1$ in the conclusion $c_2$, the smaller the value of fuzzy entropy; the smaller the difference, the greater the value of fuzzy entropy.

Similarly, fuzzy entropy Ef2 when the input $x_2$ is applied is given by the following equation:

$$Ef2 = -\frac{m_{21}}{m_{21}+m_{22}}\log\left(\frac{m_{21}}{m_{21}+m_{22}}\right) \\ -\frac{m_{22}}{m_{21}+m_{22}}\log\left(\frac{m_{22}}{m_{21}+m_{22}}\right) \tag{14}$$

The range of possible values of fuzzy entropy Ef is as follows:

$$0 \leq Ef \leq \log(n)$$

n: number of conclusions in terms of factors

In this example, the number of conclusions in terms of factor 1 ($f_1$) is two ($c_1$, $c_2$), and therefore the maximum value of fuzzy entropy Ef is log(2).

Next, a dynamic information quantity $If_{1D}(x_1)$ which prevails when the input data $x_1$ is applied is obtained using fuzzy entropy Ef1. Here the dynamic information quantity $If_{1D}(x_1)$ is the identification capability of a factor for deciding a conclusion when reasoning is performed. The greater the difference between the degree of membership $m_{11}$ of the input data $x_1$ in the conclusion $c_1$ and the degree of membership $m_{12}$ of the input data $x_1$ in the conclusion $c_2$, the larger the value of the dynamic information quantity; the smaller the difference, the smaller the value of the dynamic information quantity.

The dynamic information quantity $If_{1D}(x_1)$ regarding the factor $f_1$ is defined as the result obtained by subtracting the fuzzy entropy Ef1, which prevails when the input data $x_1$ is applied, from the maximum fuzzy entropy.

$$If_{1D}(x_1) = \log(2) + \left( \frac{m_{11}}{m_{11} + m_{12}} \log\left(\frac{m_{11}}{m_{11} + m_{12}}\right) + \frac{m_{12}}{m_{11} + m_{12}} \log\left(\frac{m_{12}}{m_{11} + m_{12}}\right) \right) \quad (15)$$

Similarly, the dynamic information quantity which prevails when the input data $x_2$ is applied is as follows, with regard to the factor $f_2$:

$$If_{2D}(x_2) = \log(2) + \left( \frac{m_{21}}{m_{21} + m_{22}} \log\left(\frac{m_{21}}{m_{21} + m_{22}}\right) + \frac{m_{22}}{m_{21} + m_{22}} \log\left(\frac{m_{22}}{m_{21} + m_{22}}\right) \right) \quad (16)$$

The dynamic information quantity computing unit 16 calculates the dynamic information quantity for every factor, in accordance with Eqs. (15) and (16), using the degrees of membership obtained by the degree-of-membership calculating unit 15.

The dynamic information quantity depends upon the input data $x_1$, $x_2$, as mentioned above. On the other hand, a static information quantity is independent of the input data. The result obtained by subtracting the average of fuzzy entropies within the range of a factor from the maximum fuzzy entropy shall be the static information quantity of the entire factor. For example, the static information quantity with regard to factor 1 is given by the following equation:

$$If_{1S} = \log(2) + \quad (17)$$

$$\left[ \sum_{x=1}^{100} \left( \frac{m_{11}(x)}{m_{11}(x) + m_{12}(x)} \log\left(\frac{m_{11}(x)}{m_{11}(x) + m_{12}(x)}\right) + \frac{m_{12}(x)}{m_{11}(x) + m_{12}(x)} \log\left(\frac{m_{12}(x)}{m_{11}(x) + m_{12}(x)}\right) \right) \right]/100$$

Similarly, the static information quantity with regard to factor 1 is given by the following equation:

$$If_{2S}(x_1) = \log(2) + \quad (18)$$

$$\left[ \sum_{x=1}^{100} \left( \frac{m_{21}(x)}{m_{21}(x) + m_{22}(x)} \log\left(\frac{m_{21}(x)}{m_{21}(x) + m_{22}(x)}\right) + \frac{m_{22}(x)}{m_{21}(x) + m_{22}(x)} \log\left(\frac{m_{22}(x)}{m_{21}(x) + m_{22}(x)}\right) \right) \right]/100$$

where
$m_{11}(x)$: degree of membership of input data x in conclusion $c_1$ with regard to factor $f_1$
$m_{12}(x)$ : degree of membership of input data x in conclusion $c_2$ with regard to factor $f_1$
$m_{21}(x)$: degree of membership of input data x in conclusion $c_1$ with regard to factor $f_2$
$m_{22}(x)$: degree of membership of input data x in conclusion $c_2$ with regard to factor $f_2$ $$\left[ \sum_{x=1}^{100} \ldots \right]/100:$$

calculation for varying x at an interval δ in the range 0–100 of the factor, computing fuzzy entropy for each x, and obtaining the average of these entropies (where $0 < \delta \leq 100$)

As will be understood from Eqs. (17) and (18), the greater the overlapping between membership functions of factors, the smaller the static information quantities of factors. Conversely, the smaller the overlapping between membership functions of factors, the greater the static information quantities of factors. In other words, the static information quantity indicates the capability of a membership function of a factor to identify a conclusion.

The static information quantity computing unit 19 computes and stores a static information quantity for every factor, in accordance with Eqs. (17) and (18), from membership functions obtained by combined knowledge. The static information quantity is independent of input data and therefore need be computed only once.

(8) Possibility computing unit

For each and every conclusion, an information quantity of a factor is calculated such that the sum total of information quantities of factors participating in the conclusion becomes 1 and the relative strengths of the information quantities of these factors do not change. This calculated information quantity is referred to as weight.

For example, when the above-described dynamic information quantities are used, each weighting is as follows:

Weight of factor 1 with respect to conclusion 1:

$$wf_{11} = If_{1D}(x_1)/[If_{1D}(x_1) + If_{2D}(x_2)] \quad (19)$$

Weight of factor 2 with respect to conclusion 1:

$$wf_{12} = If_{2D}(x_2)/[If_{1D}(x_1) + If_{2D}(x_2)] \quad (20)$$

Weight of factor 1 with respect to conclusion 2:

$$wf_{21} = If_{1D}(x_1)/[If_{1D}(x_1) + If_{2D}(x_2)] \quad (21)$$

Weight of factor 2 with respect to conclusion 2:

$$wf_{22} = If_{2D}(x_2)/[If_{1D}(x_1) + If_{2D}(x_2)] \quad (22)$$

Next, the products Of these weights and degrees of memberships are computed, these are totaled for every conclusion, and the result is outputted as the possibility of a conclusion.

For instance, in the above example, we have the following:

*Possibility of conclusion* 1: $wf_{11} \times m_{11} + wf_{12} \times m_{21}$ \quad (23)

Possibility of conclusion 2: $w_{f_{21}} \times m_{12} + w_{f_{22}} \times m_{22}$ (24)

The possibility computing unit 17 performs the foregoing computations and calculates the possibility of every conclusion.

(9) Possibility display unit

The possibility display unit 18 displays, for every conclusion, the possibility computed by the possibility computing unit 17. The display of possibility can be presented for all conclusions, or one or a plurality of possibilities can be displayed for a conclusion or conclusions for which the possibility is high. In addition, possibilities can be transmitted to another apparatus by communication or stored in a memory or file.

(10) Clarity computing unit

The clarity computing unit 20 computes the clarity of each factor for each and every conclusion. Here the clarity of each factor for each and every conclusion is taken to be an indication of the relative identification capability of each factor when the possibility of a certain conclusion is decided. Accordingly, the identification capabilities of a plurality of factors for deciding a certain conclusion can be compared depending upon clarity so that which factor possesses a high identification capability (i.e., which factor possesses a large quantity of information) can be understood. A method of calculating clarity will now be described.

First, the relationship among conclusions, factors and static information quantities is shown in Table 4.

TABLE 4

| FACTOR | CONCLUSION | |
|---|---|---|
| | c1 | c2 |
| $f_1$ | $If_{1s}$ | $If_{1s}$ |
| $f_2$ | $If_{2s}$ | $If_{2s}$ |
| TOTAL | $If_{1s} + If_{2s}$ | $If_{1s} + If_{2s}$ |

As will be understood from Table 4, the identification capabilities of a plurality of factors for deciding each conclusion can be compared depending upon static information quantities as well. However, since relative identification capability is difficult to grasp intuitively in this form, the static information quantity is normalized for each and every conclusion, as shown in the following table, and the normalized value is adapted as clarity Cl of each factor for each and every conclusion.

TABLE 5

| FACTOR | CONCLUSION | |
|---|---|---|
| | c1 | c2 |
| $f_1$ | $Cl_{11}$ | $Cl_{12}$ |
| $f_2$ | $Cl_{21}$ | $Cl_{22}$ |
| TOTAL | 1 | 1 |

In Table 5, we have $Cl_{11} = CL_{12} = If_{1s}/(If_{1s} + If_{2s})$ $Cl_{21} = CL_{22} = If_{2s}/(If_{1s} + If_{2s})$ Thus, in the clarity computing unit 20, the clarity of each factor is calculated for each and every conclusion.

(11) Clarity memory unit

The clarity memory unit 21 stores the clarity of each factor for every conclusion calculated by the clarity computing unit 20. The computation of clarity need not be performed each time reasoning is carried out. Accordingly, the clarity calculated is stored in the clarity memory unit 21 in advance when knowledge is combined, and a value that has been stored in the clarity memory unit 21 is read out whenever reasoning is executed. This makes it possible to achieve high-speed reasoning processing.

(12) Clarity adding unit

The clarity adding unit 22 calculates the clarity of a factor for which data has actually been inputted. Here, for the sake of reasoning actually carried out, the sum total of clarities of factors for which data has been inputted is calculated. The sum total of clarities indicates the clarity of the result of reasoning. It can be said that the greater the clarity, the greater the information quantity for deriving the result of reasoning. Accordingly, clarity can be used as an index for judging the reliability of the result of reasoning itself.

Clarity regarding the result of reasoning is calculated as follows:

a) In a case where data is inputted with regard to only factor 1 ($f_1$)

clarity regarding results of reasoning of of conclusion 1 ($c_1$): $Cl_1 = Cl_{11}$ clarity regarding results of reasoning of of conclusion 2 ($c_2$): $Cl_2 = Cl_{12}$ b) In a case where data is inputted with regard to only factor 2 ($f_2$)

clarity regarding results of reasoning of of conclusion 1 ($c_1$): $Cl_1 = Cl_{21}$ clarity regarding results of reasoning of of conclusion 2 ($c_2$): $Cl_2 = Cl_{22}$ c) In a case where data is inputted with regard to both factor 1 ($f_1$) and factor 2 ($f_2$)

clarity regarding results of reasoning of of conclusion 1 ($c_1$): $Cl_1 = Cl_{11} + Cl_{21} = 1.0$ clarity regarding results of reasoning of of conclusion 2 ($c_2$): $Cl_2 = Cl_{12} + Cl_{22} = 1.0$ Thus the range of possible values of clarity Cl of results of reasoning is $$0.0 \leq Cl \leq 1.0$$

In other words, in a case where reasoning is performed upon entering data regarding all factors capable of being used to deduce a certain conclusion in a body of knowledge given for reasoning is carried out, the clarity of the conclusion will be 1.0. In a case where data is inputted with regard to only some factors among the factors capable of being used to deduce a certain conclusion, clarity takes on a value between 0.0 and 1.0. If many factors having a high degree of clarity among the usable factors are employed in such case, the clarity of the conclusion also will be high and the results of reasoning will have a high reliability.

(13) Clarity display unit

The clarity display unit 23 displays the clarity of the results of reasoning (one example of which is possibility, described above) calculated by the clarity adding unit 22. Clarity can be displayed along with the results of reasoning. Alternatively, clarity can be transmitted to another apparatus or stored in a memory or file.

The display of clarity is presented with regard to all conclusions of the results of reasoning. Accordingly, in a case where a plurality of conclusions exists, the clarity corresponding to each conclusion is displayed.

Thus, whenever data is inputted, the information quantity of a factor to which the inputted data belongs is calculated and the clarity regarding the results reasoning is displayed, thereby making it possible for the user to judge the reliability of the results of reasoning.

(14) Clarity Embodiment

The approximate reasoning apparatus according to the first embodiment shown in FIG. 1 has the case-history data memory unit 31, in which the relationships between factors and conclusions which have occurred are stored. The relationships between factors and conclusions can be stored at every occurrence, or they can be stored collectively after several occurrences.

An example of the case-history data is illustrated in FIG. 6. Here it is shown that conclusion $c_1$ occurs at the first occurrence, and that the values of factors $f_1$ and $f_2$ at this time are 30 and 60, respectively. Further, it is shown that conclusion $c_2$ occurs at the second occurrence, and that the value of factors $f_2$ and $f_3$ at this time are 10 and 30, respectively.

If this approximate reasoning apparatus is applied to a fault diagnosing system, relationships between factors and conclusions occur when a fault develops. Conclusions correspond to the types of faults, and factors correspond to the symptoms (states perceived by the five senses, output signals from various sensors, etc.) at such time. A record (fault data) representing these relationships between faults and their symptoms can be obtained from a repair report, a maintenance report, a fault report, etc. The case-history data memory unit 31 would be referred to as a fault data memory unit in such case.

The storing of this fault data in the memory unit 31 can be accomplished by a human being entering the data using an input unit, or by an on-line method in which the data is entered from item of equipment undergoing diagnosis.

The knowledge synthesizing/revising unit 12 revises the synthesized knowledge, which has been stored in the synthesized knowledge memory unit 13, by the case history data stored in the case-history data memory unit 31. It will suffice to revise only the synthesized knowledge that relates to the case-history data.

The method of revision is the same as the synthesizing method described above, and the case-history data may be thought of as the knowledge of one or a plurality of experts.

By way of example, if only case-history data at a first occurrence exists, this case-history data is related to conclusion $c_1$ and factors $f_1$, $f_2$, and therefore the synthesized knowledge regarding this conclusion and these factors is revised. At the first use of the case-history data, it cannot be determined whether this is a minimum or maximum value, and therefore this case-history data is employed as both values.

First, with regard solely to conclusion c1 and factor $f_1$, Eqs. (7) and (8) respectively expressing the mean value $m_{min}$ of the minimum values and the mean value $m_{max}$ of the maximum values are revised as follows:

$$m_{min} = \frac{20 + 30 + 30}{3} = 26.7 \tag{25}$$

$$m_{max} = \frac{60 + 50 + 30}{3} = 46.7 \tag{26}$$

The equations (9) and (10) respectively expressing the standard deviation $\sigma_{min}$ of the minimum values and the standard deviation $\sigma_{max}$ of the maximum values are revised as follows:

$$\sigma_{min} = \left( \frac{20^2 + 30^2 + 30^2}{3} - m_{min}^2 \right)^{\frac{1}{2}} = 4.5 \tag{27}$$

$$\sigma_{max} = \left( \frac{60^2 + 50^2 + 30^2}{3} - m_{max}^2 \right)^{\frac{1}{2}} = 12.3 \tag{28}$$

The synthesized data relating to conclusion $c_1$ and factor $f_2$ is revised in the same manner.

Since the case-history data at the second occurrence is not related to the conclusion $c_1$, the synthesized knowledge relating to the conclusion $c_1$ is not revised by this case-history data. The synthesized data relating to conclusion $c_2$ is revised by the case-history data at the second occurrence.

When case-history data from first through third occurrences exists, the synthesized knowledge expressing the relationship between $c_1$ and $f_1$ is revised as follows: With regard to factor $f_1$, there are a first factor value 30 and a third factor value 60. Accordingly, the smaller, namely 30, is considered to be the minimum value of the third expert, and the larger, namely 60, is considered to be the maximum value.

Eqs. (7) and (8) respectively expressing the mean value $m_{min}$ of the minimum values and the mean value $m_{max}$ of the maximum values are revised as follows:

$$m_{min} = \frac{20 + 30 + 30}{3} = 26.7 \tag{29}$$

$$m_{max} = \frac{60 + 50 + 60}{3} = 56.7 \tag{30}$$

The equations (9) and (10) respectively expressing the standard deviation $\sigma_{min}$ of the minimum values and the standard deviation $\sigma_{max}$ of the maximum values are revised as follows:

$$\sigma_{min} = \left( \frac{20^2 + 30^2 + 30^2}{3} - m_{min}^2 \right)^{\frac{1}{2}} = 4.5 \tag{31}$$

$$\sigma_{max} = \left( \frac{60^2 + 50^2 + 60^2}{3} - m_{max}^2 \right)^{\frac{1}{2}} = 4.3 \tag{32}$$

Thus, in a case where there are plural items of case-history data regarding specific factors relating to a certain conclusion, these items of data are arranged in order of increasing size, the items of data constituting the smaller half are treated as minimum values, and the items of data constituting the larger half are treated as maximum values. Further, in a case where the items of case-history data are odd in number, the item of data whose size is exactly in the middle is adopted as both a minimum value and a maximum value. This item of data whose size is exactly in the middle may be included in either the group of minimum values or the group of maximum values.

When the synthesized knowledge is thus revised by the case-history data to which it corresponds, the knowledge after revision is stored in the synthesized knowledge memory unit 13 in place of the earlier synthesized knowledge, and it is applied to the static information quantity computing unit 19. Accordingly, from this point onward, approximate reasoning is performed used the revised knowledge. In other words, the possibility of a conclusion is computed using the revised knowledge. In addition, re-computation of static information quantities, clarity, etc., is performed solely in portions relating to the revised knowledge by making use of the revised knowledge.

Since knowledge is thus revised automatically by case-history data, more accurate reasoning becomes possible and the system will come to possess an automatic learning function.

(15) Second Embodiment

In the second embodiment illustrated in FIG. 7, the knowledge memory unit 11 shown in FIG. 1 is not provided. The case-history data memory unit 31 is the same as that shown in FIG. 1. Though the data synthesizing unit 12A and synthesized data memory unit 13A basically are the same as the knowledge synthesizing/revising unit 12 and synthesized knowledge memory unit 13 described above, the units 12A, 13A of this embodiment differ in that they deal with case-history data and not with the knowledge of experts.

The approximate reasoning apparatus of the second embodiment does not require expert knowledge, and all rules and membership functions for approximate reasoning are created from case-history data.

It is assumed that case-history data of the kind shown in FIG. 6 has been stored in the case-history data memory unit 31. Since the first through fifth items of case-history data, with the exception of the second item, are related to the conclusion $c_1$ and factors $f_1$, $f_2$, a rule concerning the conclusion $c_1$ and factors $f_1$, $f_2$ can be created by these items of case-history data.

Figure 8A:
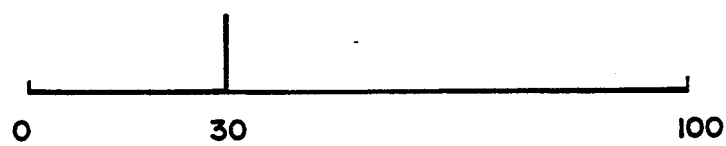
Figure 8B:
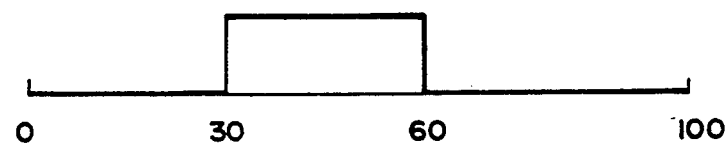
Figure 8C:
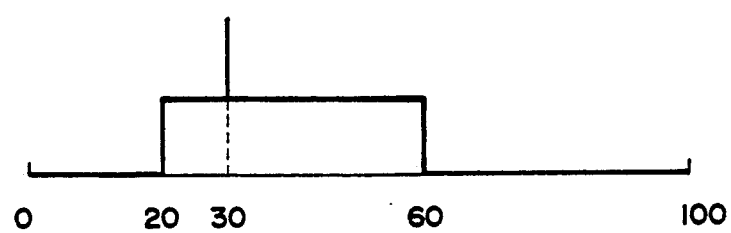
Figure 8D:
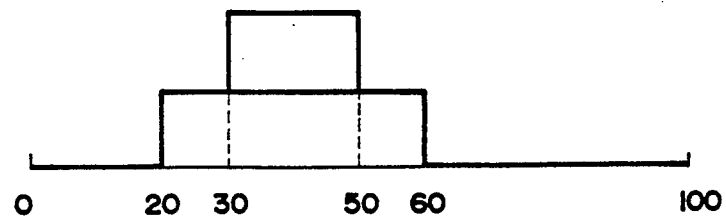

FIGS. 8a through 8d illustrate distributions of case-history data related to the conclusion $c_1$ and factor $f_1$. FIG. 8a represents only the first item of data, FIG. 8b the first and third items of data, and FIG. 8c the first, third and fourth items of data. FIG. 8d represents all data with the exception of the second item. If the number of items of case-history data is increased in this fashion, the distribution thereof becomes correspondingly clearer. By adopting this method, therefore, a membership function of the factor $f_1$ for deducing the conclusion cl is created.

The method of synthesizing the case-history data is the same as that described above. The items of data are arranged in one row in order of size and divided in half, with one group having the smaller values and the other group the larger values, data (mean value, standard deviation) relating to the minimum value is created from the group of smaller data values, and data relating to the maximum value is created from the group of larger data values. Such data synthesis requires three or more items of case-history data. If there are just two items of case-history data, the smaller is adopted as the minimum value and the larger as the maximum value.

The items of case-history data relating to conclusion $c_1$ and factor $f_1$ shown in FIG. 6 are 30, 60, 20 and 50. When these are arranged in order of size, we have 20, 30, 50, 60. The smaller of these values, namely 20, 30, are adopted as minimum values (which correspond to the minimum values in the knowledge of the experts), and the larger, namely 50, 60 are adopted as maximum values (which correspond to the maximum values in the knowledge of the experts).

The mean value $m_{min}$ of the minimum values and the mean value $m_{max}$ of the maximum values are calculated as follows using these items of case-history data:

$$m_{min} = \frac{20 + 30}{2} = 25 \tag{33}$$

$$m_{max} = \frac{60 + 50}{2} = 55 \tag{34}$$

The standard deviation $\sigma_{min}$ of the minimum values and the standard deviation $\sigma_{max}$ of the maximum values are calculated as follows:

$$\sigma_{min} = \left( \frac{20^2 + 30^2}{2} - m_{min}^2 \right)^{\frac{1}{2}} = 5 \tag{35}$$

$$\sigma_{max} = \left( \frac{60^2 + 50^2}{2} - m_{max}^2 \right)^{\frac{1}{2}} = 5 \tag{36}$$

Data expressing the relationship between conclusion $c_1$ and factor $f_2$ and between other conclusions and factors is synthesized in the same way.

The data obtained by synthesizing the case-history data is as shown in Table 6 below. Here the items of data for factor $f_2$ relating to conclusion $c_1$ are only three in number, and therefore the two smaller items are treated as minimum values and the largest item is treated as the maximum value. With regard to conclusion $c_2$, there is only one item of case-history data concerning each of factors $f_2$, $f_3$, and therefore these items of data are employed as the minimum and maximum values.

TABLE 6

| | CONCLUSION $c_1$ | | | | |
|---|---|---|---|---|---|
| | MINIMUM VALUE | | MAXIMUM VALUE | | NUMBER OF |
| FACTOR | AV. VALUE | STAND. DEV. | AV. VALUE | STAND. DEV. | DATA ITEMS |
| $f_1$ | 25 | 5 | 55 | 5 | 4 |
| $f_2$ | 55 | 5 | 60 | 0 | 3 |
| $f_3$ | 0 | 0 | 0 | 0 | 0 |

| | CONCLUSION $c_2$ | | | | |
|---|---|---|---|---|---|
| | MINIMUM VALUE | | MAXIMUM VALUE | | NUMBER OF |
| FACTOR | AV. VALUE | STAND. DEV. | AV. VALUE | STAND. DEV. | DATA ITEMS |
| $f_1$ | 0 | 0 | 0 | 0 | 0 |
| $f_2$ | 10 | 0 | 10 | 0 | 1 |

TABLE 6-continued

| f$_3$ | 30 | 0 | 30 | 0 | 1 |
|---|---|---|---|---|---|

The above-described data synthesizing method is expressed generally as follows:

Let n represent the number of items of case-history data relating to the relationship between a certain conclusion and factor. These items of data are arranged in ascending order. Let the stored data be as follows:

$$d_1, d_2, d_3, \ldots d_n \quad (15)$$

where $d_1$ is the item of data having the smallest value, and $d_n$ is the item of data having the largest value.

The mean value $m_{max}$ and standard deviation $\sigma_{min}$ of the minimum values are given by the following equations:

$$m_{min} = \left( \sum_{i=1}^{n_1} d_i \right)/n_1 \quad (37)$$

$$\sigma_{min} = \left[ \sum_{i=1}^{n_1} (d_i)^2/n_1 - m_{min}^2 \right]^{\frac{1}{2}} \quad (38)$$

where $n_1$ is a value obtained by rounding off n/2 to the nearest whole number.

The mean value $m_{max}$ and standard deviation $\sigma_{max}$ of the maximum values are given by the following equations:

$$m_{max} = \left( \sum_{i=1}^{n_1} d_{n-i+1} \right)/n_1 \quad (39)$$

$$\sigma_{max} = \left[ \sum_{i=1}^{n_1} (d_{n-i+1})^2/n_1 - m_{max}^2 \right]^{\frac{1}{2}} \quad (40)$$

The synthesized data thus created is stored in the synthesized data memory unit 13A. The above-described approximate reasoning is then performed based upon this synthesized data. That is, the possibility of a conclusion, static information quantities and clarities.

It goes without saying that the units 11–23, 12A, 13A and 31 can be realized by a computer which includes a memory and a display device. For example, the knowledge synthesizing unit 12, data synthesizing unit 12A and the various arithmetic units 15, 16, 17, 19, 20, 22 can be ideally implemented by a CPU which operates in accordance with a program.

As many apparently widely different embodiments of the present invention can be made without departing from the spirit and scope thereof, it is to be understood that the invention is not limited to the specific embodiments thereof except as defined in the appended claims.

What is claimed is:

1. An approximate reasoning apparatus comprising:
   a knowledge memory storing knowledge which represents relationships between factors and conclusions already established;
   a synthesized knowledge memory storing knowledge synthesized with regard to the same factors and conclusions;
   a case-history data memory storing data representing relationships between factors and conclusions which actually have occurred;
   a knowledge synthesizing/revising unit which accesses said knowledge memory, said synthesized knowledge memory and said case history data memory, and which synthesizes knowledge that concerns the same factors and conclusions as the knowledge stored in said knowledge memory, and which by using the data stored in said case-history data memory, re-synthesizes the synthesized knowledge stored in said synthesized knowledge memory, wherein the knowledge re-synthesized by said knowledge synthesizing/revising unit is used to update the synthesized knowledge stored in said synthesized knowledge memory; and
   approximate reasoning means for accessing said synthesized knowledge memory and computing the possibility of a conclusion by applying factor-input data to the synthesized knowledge stored in said synthesized knowledge memory.

2. The apparatus according to claim 1, wherein said approximate reasoning means includes:
   a degree-of-membership computing unit for converting inputted data into a degree of membership using a membership function represented by said synthesized knowledge;
   a dynamic information quantity computing unit for obtaining a dynamic information quantity for every factor using the degree of membership produced by said degree-of-membership computing unit; and
   a possibility computing unit for obtaining the possibility of a conclusion using the degree of membership produced by said degree-of-membership computing unit and the dynamic information quantity obtained by said dynamic information quantity computing unit.

3. The apparatus according to claim 1, wherein when the synthesized knowledge stored in said synthesized knowledge memory has been updated, said approximate reasoning means performs a re-computation of the possibility of a conclusion based upon the synthesized knowledge after updating.

4. The apparatus according to claim 1, further comprising a static information quantity computing unit for computing a static information quantity of each factor based upon the synthesized knowledge produced by said knowledge synthesizing/revising means.

5. The apparatus according to claim 4, wherein said static information quantity computing unit re-computes the static information quantity of each factor in relation to the re-synthesized knowledge when the synthesized knowledge has been re-synthesized.

6. The apparatus according to claim 4, further comprising a clarity computing unit for computing the clarity of each factor for every conclusion using the static information quantities computed by said static information quantity computing unit.

7. The apparatus according to claim 6, wherein said clarity computing unit re-computes clarity using the static information quantities obtained by re-computation when the synthesized knowledge has been re-synthesized.

8. The apparatus according to claim 6, further comprising an adding unit for computing the clarity of every conclusion by adding the clarity of factors, for which data has actually been inputted, using the clarity obtained from said clarity computing unit.

9. An approximate reasoning apparatus comprising:
case-history data memory storing relationship between factors and conclusions which actually have occurred;
a data synthesizer which retrieves a plurality of related items of data regarding factors and conclusions and for each retrieved plurality of related items synthesizes one item of data regarding the same factors and conclusions;
synthesized data memory storing data synthesized by said data synthesizer; and
approximate reasoning means for retrieving synthesized data from said synthesized data memory and determining of the possibility of a conclusion by applying factor-input data to the synthesized data retrieved from said synthesized data memory.

10. The apparatus according to claim 9, wherein said approximate reasoning means includes:
a degree-of-membership computing unit for converting inputted data into a degree of membership using a membership function represented by the said synthesized data retrieved from said synthesized data memory;
a dynamic information quantity computing unit for obtaining a dynamic information quantity for every factor using the degree of membership produced by said degree-of-membership computing unit; and
a possibility computing unit for obtaining the possibility of a conclusion using the degree of membership produced by said degree of membership computing unit and the dynamic information quantity obtained by said dynamic information quantity computing unit.

11. The apparatus according to claim 9, further comprising:
a static information quantity computing unit for computing a static information quantity of each factor based upon the synthesized data;
a clarity computing unit for computing the clarity of each factor for every conclusion using the static information quantities computed by the static information quantities computed by the static information quantity computing unit; and
an adding unit for computing the clarity of every conclusion by adding the clarity of factors, for which data has actually been inputted, using the clarity obtained from said clarity computing unit.

* * * * *